United States Patent [19]

Kuroda

[11] Patent Number: 4,755,791
[45] Date of Patent: Jul. 5, 1988

[54] CORNER POLE DEVICE FOR VEHICLES

[75] Inventor: Mikio Kuroda, Saitama, Japan

[73] Assignee: Honda Giken Kogyo Kabushiki Kaisha, Tokyo, Japan

[21] Appl. No.: 119,505

[22] Filed: Nov. 12, 1987

[30] Foreign Application Priority Data

Nov. 14, 1986 [JP] Japan .................. 61-271548

[51] Int. Cl.⁴ ............................. B60Q 1/26
[52] U.S. Cl. .................. 340/115; 116/28 R; 362/61; 362/82; 362/802; 362/276; 343/721
[58] Field of Search ............ 362/61, 80, 82, 802; 116/28 R, 28 A, 202; 340/62, 52 R, 115; 343/894, 901, 721

[56] References Cited

U.S. PATENT DOCUMENTS

| 1,771,817 | 7/1930 | Ragsdale | 340/115 |
|---|---|---|---|
| 1,877,792 | 9/1932 | Bell | 340/115 |
| 2,170,600 | 8/1939 | Voll | 340/115 |
| 2,753,439 | 7/1956 | Greenfield | 340/115 |
| 3,829,828 | 8/1974 | Hutchinson et al. | 340/62 |
| 3,858,924 | 1/1975 | Bures | 116/28 R |
| 3,980,999 | 9/1976 | Nishioka et al. | 340/52 R |
| 3,998,285 | 12/1976 | Cooper | 116/28 R |
| 4,190,841 | 2/1980 | Harada | 343/901 |
| 4,313,104 | 1/1982 | Phillips | 116/28 A |
| 4,649,398 | 3/1987 | Yamamoto et al. | 343/903 |

FOREIGN PATENT DOCUMENTS 60-67239 4/1985 Japan ................. 362/82
61-3137 1/1986 Japan .

Primary Examiner—Ira S. Lazarus
Assistant Examiner—Sue Hagarman
Attorney, Agent, or Firm—Armstrong, Nikaido, Marmelstein & Kubovcik

[57] ABSTRACT

A corner pole device for vehicles comprises a drive mechanism by which a pole assembly vertically telescopically movable with respect to a housing thereof disposed at a corner part of a vehicle body is driven to expand and contract between an expanded position and a housed position. The corner pole device further comprises a control means for automatically controlling the drive mechanism to thereby drive the pole assembly into a telescopic action, depending on a detection signal from a mechanism which detects the travelling condition of vehicle.

8 Claims, 4 Drawing Sheets

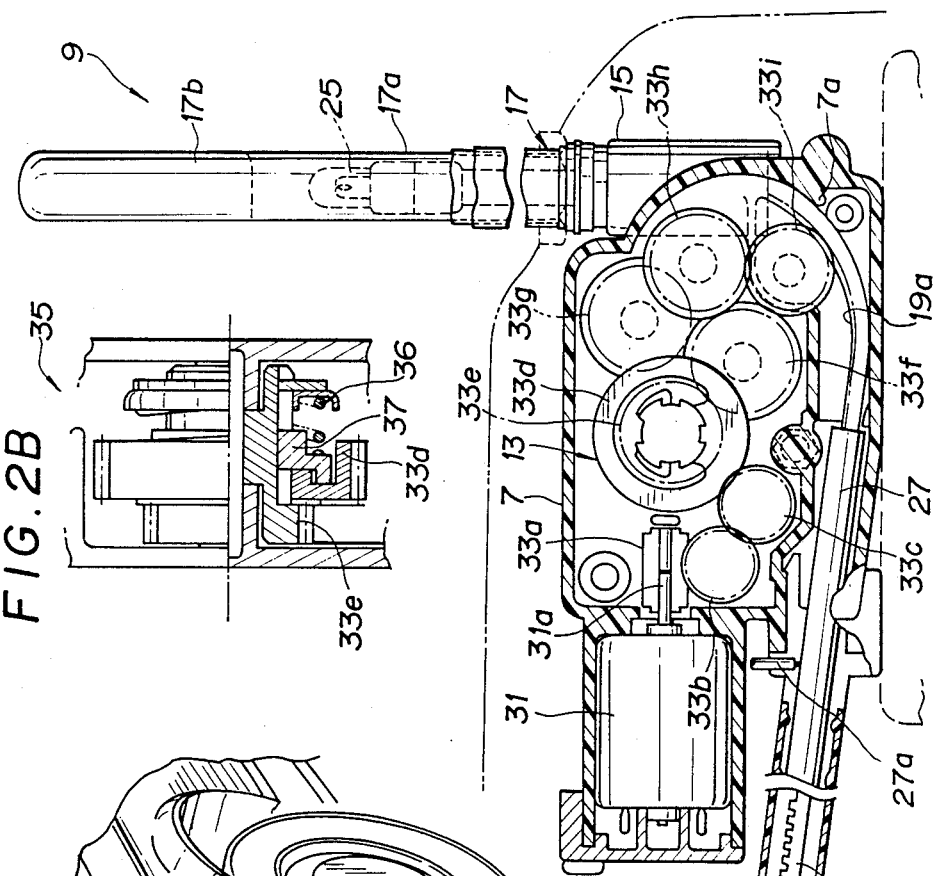
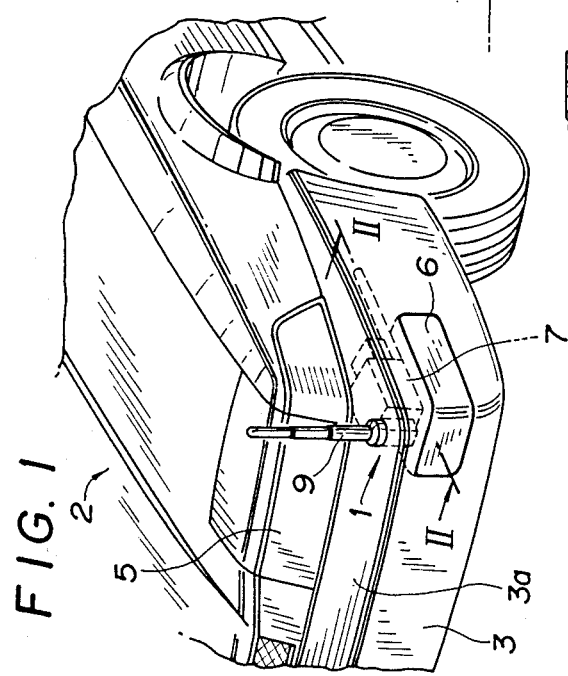
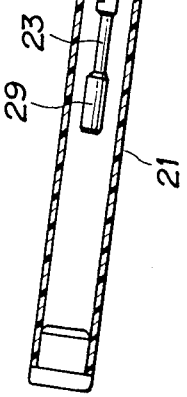

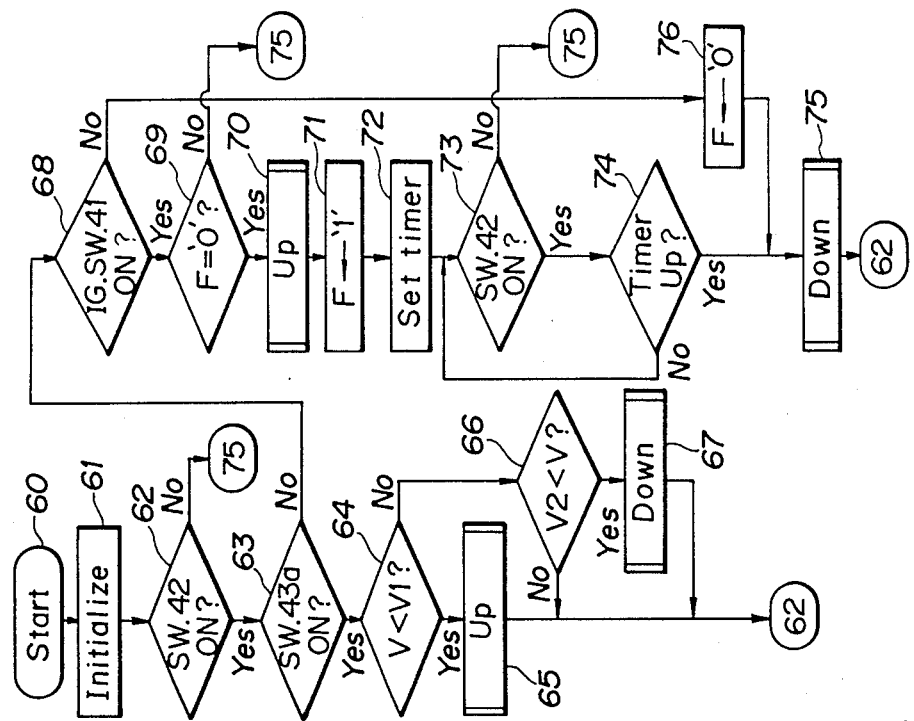
FIG. 3C
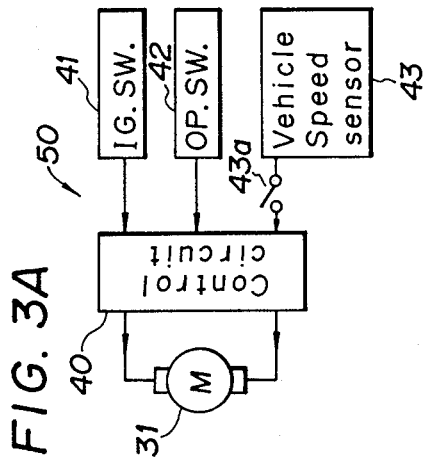
FIG. 3A
| OP. SW. 42 | IG. SW. 41 | ON | ACC | OFF | 43a ON | | |
|---|---|---|---|---|---|---|---|
| | | | | | V1<V | V<V1 | |
| ON | | Up and Down | Down | Down | Down | Up | |
| OFF | | Down | Down | Down | Down | Down | Down |
FIG. 3B

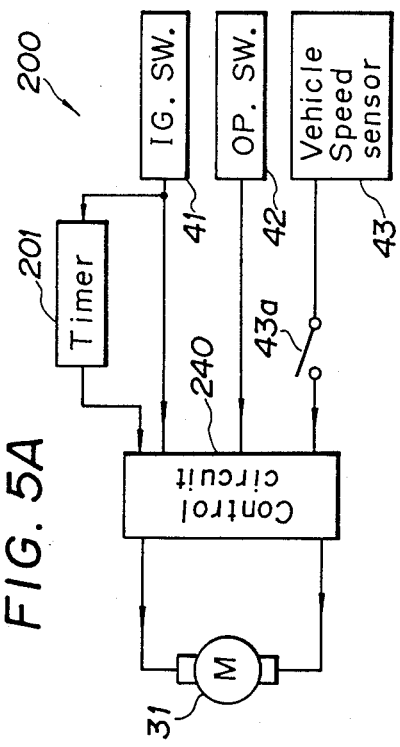
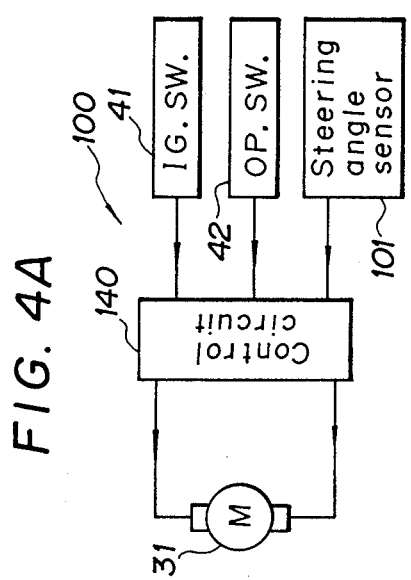

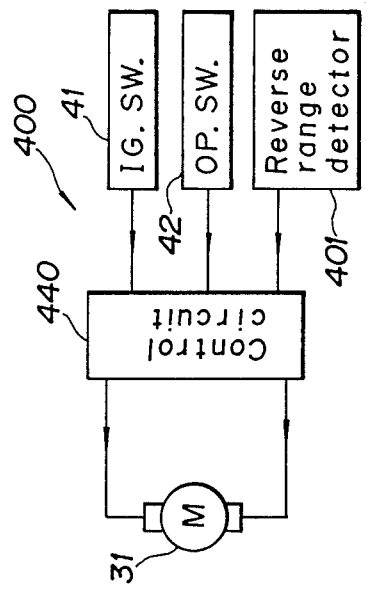
FIG. 7A
| OP. SW. 42 \ IG. SW. 41 | ON | ACC | OFF | not R | R |
|---|---|---|---|---|---|
| ON | Up and Down | Down | Down | Down | Up |
| OFF | Down | Down | Down | Down | Down |
FIG. 7B
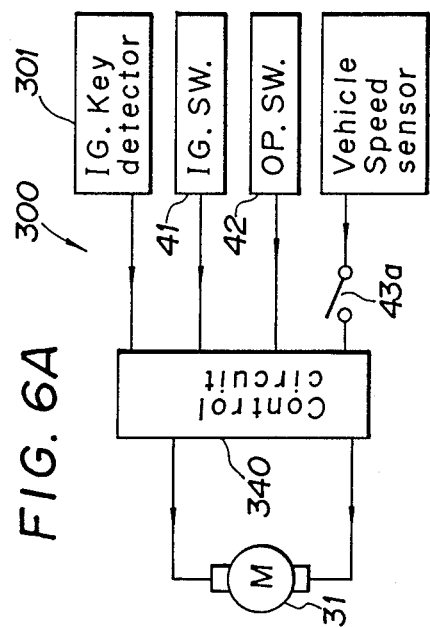
FIG. 6A
| OP. SW. 42 \ IG. SW. 41 | ACC | OFF |
|---|---|---|
| ON | Conditional Down | Conditional Down |
| OFF | Down | Down |
FIG. 6B 4,755,791

CORNER POLE DEVICE FOR VEHICLES

BACKGROUND OF THE INVENTION

1. Field of the Invention

The present invention relates to a pole device to be installed at the front or rear part of a vehicle body.

2. Description of Relevant Art

The corner pole of vehicle generally is utilized to prospect from inside of vehicle the position of a corner part of the vehicle body, such as in a garaging or parking operation or when travelling with a low speed along a curved and/or narrow road which may be fenced or walled up at both sides. If the vehicle speed is high, however, the pole is let to go against strong wind pressures, with an increased aerodynamic resistance to the vehicle body and an ear catching sound produced as it clears its way through the air. To solve such a problem there has been proposed by the present applicant himself a corner pole device having a corner pole telescopically expandable and contractible to be housed in a corner part of vehicle body, as disclosed in Japanese Utility Model Application Laying-Open Gazette No. 61-3137, published Jan. 10, 1986. In the corner pole device disclosed in the Gazette, the corner pole is driven into a telescopic action by a remote control operation using a manual swich, to take an expanded position visible of full contour and a housed position where it is almost fully hidden in the corner part of vehicle body. The corner pole device is advantageous, exemplarily in that the corner pole is permitted to be contracted into the housed position with a remote control operation by the driver, so that the aerodynamic resistance to vehicle body is decreased and the production of wind tearing sound is prevented, when the vehicle travels with a high speed.

In the corner pole device, however, the manual switch for remote control of corner pole is installed inside the passenger room, to be operated by the driver. Such a corner pole device may be more advantageous if it has an automatically controllable corner pole in conjunction with the driver's operation such as of a steering wheel and/or lamp turning lever.

The present invention has been achieved to effectively substantiate such a desirable conception on the basis of a conventional corner pole device for vehicles.

SUMMARY OF THE INVENTION

An object of the present invention is to provide a corner pole device for vehicles in which a corner pole is successfully permitted to aptly take either of an expanded position and a housed position, in dependence on the travelling condition of vehicle.

To achieve such an object, the present invention provides a corner pole device for vehicles including a vertically extendable and contractible pole assembly disposed at a corner part of a vehicle body, and a drive mechanism for driving the pole assembly to expand and contract between an expanded position and a housed position, wherein the corner pole device comprises a means for detecting the travelling condition of vehicle, and a control means for automatically starting the drive mechanism to have the pole assembly expanded and contracted in dependence on a detection signal from the travelling condition detecting means.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

FIG. 1 is a perspective view of a pole and a housing of a corner pole device for vehicles according to a preferred embodiment of the present invention, as installed at a front corner part of a vehicle.

FIG. 2A is a sectional view taken along line II—II of FIG. 1 to describe the housing.

FIG. 2B is a sectional view of a frictional clutch of a pole driving mechanism in the housing.

FIGS. 3A and 3B are block diagram and function table according to a first embodiment of a control part of the corner pole device, respectively.

FIG. 3C is a schematic flowchart of processes to be executed at a CPU in a circuit of the control part of FIG. 3A.

FIGS. 4A and 4B are block diagram and function table according to a first modified example of the first embodiment, respectively.

FIGS. 5A and 5B are block diagram and function table according to a second modified example of the first embodiment, respectively.

FIGS. 6A and 6B are block diagram and function table according to a third modified example of the first embodiment, respectively.

FIGS. 7A and 7B are block diagram and function table according to a second embodiment of the control part of the corner pole device, respectively.

DETAILED DESCRIPTION OF THE PREFERRED EMBODIMENT

Referring to FIG. 1, designated at reference numeral 1 is a corner pole device for vehicles according to a preferred embodiment of the present invention, which in the embodiment is disposed in the left corner part of a front bumper 3 of an automobile 2, just in front of a head lamp 5. The device 1 comprises a synthetic resin housing 7 fixed to the inner wall of bumper 3, a vertically telescopic pole assembly 9 held by the housing 7 in a standing position through an upper wall portion 3a of bumper 3, and a drive mechanism (FIG. 2A) accommodated in the housing 7 to make the pole assembly 9 telescopically move between an expanded position and a housed position. Designated by reference numeral 6 is a position lamp, and 7a is a guide lug for a flexible drive cord 19.

FIG. 2A is a sectional view along line II—II of FIG. 1, showing the interior of housing 7. Reference numeral 13 represents the drive mechanism accommodated in the housing 7 for a vertically telescopic actuation of assembly 9. At the front end of housing 7 there is an integrally formed hollow tubular support 15, which upwardly extends through the upper wall portion 3a of bumper 3 to have an upward opening thereover.

The pole assembly 9 is vertically installed in the upward opening of tubular support 15. Assembly 9 comprises a telescopic pole 17 and the cord 19 made of a synthetic resin. Code 19 is inserted into the pole 17 which consists of a number of tubular pole members fitted one on the other in a telescopic manner so as to permit a vertical expansion and contraction. The uppermost one 17a of the pole members has a transparent top plug 17b fitted thereon.

The inserted code 19 is connected at the upper end to the uppermost pole member 17a. The remaining part of cord 19 substantially downwardly extends till it reaches the upside of a bottom portion of housing 7, where it has a rearwardly changed direction to extend into a guide tube 21 fixed to the rear face of a lower portion of housing 7. The code 19 is formed at one side thereof, throughout the length, with rack teeth 19a meshing with an output gear 33i of the drive mechanism 13. As the gear 33i rotates, the flexible cord 19 is driven into a curvilinear movement along its own axis so that the uppermost pole member 17a connected to the upper end of cord 19 moves up and down, thus driving the entirety of pole 17 into a vertical telescopic action The cord 19 has therein, throughout the length, an electric lead wire 23 extending therethrough. The lead wire 23 is connected at the upper end to a bulb 25 installed inside the uppermost pole member 17a. The rear end of wire 23 carries a mobile terminal 29 secured thereto. In a transition area between housing 7 and guide tube 21 there is installed an insulating tube 27 through which the cord 19 rearwardly extends. The tube 27 has an unshown stationary terminal installed therein, which is connected to respective on-off switches of a head light and a small lamp through a sheathed lead wire 27a that permits conduction of an electric current when the light and lamp are either or both turned on. As the cord 19 is frontwardly driven in excess of a predetermined stroke from a rearmost retreat position thereof, the mobile terminal 29 at the rear end of cord 19 is brought into contact with the stationary terminal in the insulating tube 27, when the bulb 25 goes on.

The drive mechanism 13 includes an electric motor 31 installed in the rear part of housing 7, and first to eighth gears 33a-33h for transmitting power from the motor 31 to the output gear 33i. The first gear 33a is a worm gear fixed on a horizontally extending drive shaft 31a of motor 31. The fourth and fifth gears 33d, 33e cooperatively constitute a reduction gearing with an intervenient friction clutch 35. As shown in FIG. 2B, the fourth gear 33d at the drive end is pressed onto the fifth gear 33e, with a predetermined pressure exerted by a push member 37 which is biassed with a spring 36. The friction clutch 35 is constituted with the spring 36, push member 37, and associated parts of the fourth and fifth gears 33d, 33e, so that drive power is transmitted from the fourth gear 33d to the fifth gear 33e while this gear 33e is loaded with a smaller rotational force than the frictional force to be produced therebetween under the pressure by the push member 37. When the frictional force is overcome by the load imposed on the fifth gear 33e, the fourth gear 33d slips relative to the gear 33e, thus failing in transmission of drive power to the subsequent gears. The friction clutch 35 is thus permitted to let loose output power of the motor 31, as it is put in service, when the pole 17 is expanded to the end or completely housed.

With reference to FIGS. 3A, 3B and 3C, there will be described below the constitution as well as function of a control part 50 which controls the motor 31 of drive mechanism 13 to thereby drive the telescopic pole 17 to expand and contract.

The control part 50 comprises a control circuit 40 to which detection signals are input directly from an ignition switch (hereinafter called IG.SW.) 41 and a remote control operation switch 42, and indirectly from a vehicle speed sensor 43 through a manual select switch 43a. The control circuit 40 includes such an unshown microcomputer unit that follows a function table of FIG. 3B to drive the motor 31 to rotate with a relatively low speed in either sense of the direction of rotation. The drive period in which the motor 31 is put in service is preset somewhat longer than the required time for the pole 17 to contract from the expanded position to the housed position or to reversely expand. The operation switch 42 is selectively set to an on position or off position by operation of the driver, and the set state is detected by the control circuit 40. The manual switch 43a as well as operation switch 42 is allowed to be voluntarily turned on and off by the driver.

The function of control circuit 40 is as shown in FIG. 3B. In the table given, represented by word "up" is such a phase or state that the pole assembly 9 is expanded to be kept in the expanded position by driving the motor 31, and "down" is such that it is contracted or housed to be kept in the housed condition by same. When either of "up" and "down" comes into existence by any combination of switch operations, if it is the same as before, the pole assembly 9 will be left as it is, i.e., will not expand nor contract. For example, the assembly 9 remains in the "down" state, when IG.SW. 41 is changed from the off position to an ACC (accessory) position under such a condition that the operation switch 42 is put in the on position.

Under such a condition that the operation switch 42 is kept or turned off, the pole assembly 9 is rendered "down" irrespective of other conditions.

In the case the switch 42 is kept on, the manual switch 43a of vehicle speed sensor 43 has a priority to IG.SW. 41. While the operation switch is on and the manual switch 43a is close, therefore, the pole assembly 9 is controlled to be expanded and contracted in dependence on the vehicle speed, irrespective of the position of IG.SW. 41, although practically the IG.SW. 41 is left as it is turned on when the vehicle travels. The assembly 9 is rendered "up" when the vehicle speed V is lower than a predetermined value V1, 60 km/h for example, and "down" when it is higher than the value V1. The detection mode of vehicle speed V however is given a hysteresis for the prevention of a hunting that the motor 31 otherwise may experience in the vicinity of the critical value V1.

Under the condition that the operation switch 42 is on and concurrently the manual switch 43a of vehicle speed sensor 43 is open, the pole assembly 9 expands or contracts, depending on the position of IG.SW. 41. When the IG.SW. 41 is turned on from the off or ACC position, the assembly 9 experiences an "up" phase for a predetermined period of time, which may exemplarily be three minutes, before it enters "down" state. In the case the IG.SW. 41 is changed to the off or ACC position, the assembly 9 is rendered "down".

The foregoing function of control circuit 40 permits the pole assembly 9 to automatically take the expanded or housed position while the remote control operation switch 42 is set in the on position. When IG.SW. 41 is turned on to start the vehicle, the pole assembly 9 is thus first expanded for the predetermined period and thereafter automatically housed. In the case the operation switch 42 is turned on and the manual switch 43a is closed, the assembly 9 is expanded when the vehicle speed V is lower than the value V1, and housed when it is higher than V1. The pole assembly 9 is thus automatically driven to take an apt postion, i.e. the expanded or housed position, in accordance with the travelling condition of vehicle. Under such a condition that the vehicle speed is relatively high, the assembly 9 is automatically housed, thus decreasing the aerodynamic resistance to the vehicle body and effectively preventing the sound that may catch the ears when an object clears its way through the air.

Shown in FIG. 3C is a flowchart of processes to be executed at the CPU in the control circuit 40. The CPU is normally coupled with a battery in the vehicle and thus powered on.

With the CPU reset by a resetting operation of control circuit 40 or initial connection to the battery, a control flow starts at a step 60.

At a step 61, the CPU has its circuitries, memories, flags and the like all initialized. In particular, a flag F to be employed at later steps 71 and 76 is rest '0'.

At a decision step 62 there is made a judgment as to whether or not the operation switch 42 is on. If the switch 42 is on, the flow goes to a step 63. If it is off, the flow goes to a step 75.

At step 63, it is judged whether or not the manual switch 43a of vehicle speed sensor 43 is on. If the switch 43a is on, the flow goes to a step 64. If it is not so, the flow goes to a step 68.

At step 64, it is judged whether or not the vehicle speed V is lower than the predetermined value V1, 60 km/h for example. If it is so, the flow goes to a step 65. If is not, the flow goes to a step 66.

At step 65, there is called a subroutine for causing the pole assembly 9 to move from the housed position to the expanded position. If the assembly 9 is already put in the expanded position, no process is executed in the subroutine. After the step 65, the flow again goes to the step 62.

At step 66, it is judged whether or not the vehicle speed V is larger than another predetermined value V2, 70 km/h for example. If it is so, the flow goes to a step 67. If it is not, the flow goes to the step 62, without modification.

At step 67, there is called a subroutine for causing the pole assembly 9 to move from the expanded position to the housed position. If the assembly 9 is already put in the housed position, no process is executed in the subroutine. After the step 67, the flow again goes to the step 62.

The values V1, V2 are predetermined to have a sufficient differential, 10 km/h in the aforementioned case, as the hysteresis to prevent the hunting of motor 31 in the vicinity of value V1. Such a hysteresis range (60 km/h-70 km/h) may be properly shifted, provided that the value V1 is included. In a case the vehicle is equipped with an automatic cruising device, the hysteresis range (10 km/h) may preferably be set wider than a vehicle speed band (dead zone) for a constant-speed travelling by the cruising device.

At step 68, there is made a judgment as to whether or not the IG.SW. 41 is on. If the switch 41 is on, the flow goes to a step 69. If it is not so, the flow goes to step 76.

At step 69, the flag F is judged as to whether it is '0' or not. If it is so, the flow goes to a step 70. If it is not, the flow goes to step 75.

At step 70, a similar subroutine to the case of step 65 is called to have the pole assembly 9 expanded.

At a step 71, the flag F is set '1'. Then, at a step 72, a software timer has a perdetermined delay time set thereon, 3 minutes for example.

Then, the flow makes an idling between steps 73 and 74 till the set time on the timer is elapsed. There is made at the step 73 a judgment as to whether or not the operation switch 42 is still kept on. If it is so, the flow goes to the step 74, where the set time is judged as to if it is elapsed or not. If the set time is not elapsed, the flow again goes to the step 73, so that the flow idles away till the set time is over.

If the operation switch 42 is turned off in the course of such an idling, i.e., under the condition that the pole assembly 9 is in the expanded position, then the flow slips out to step 75.

At step 75, a similar subroutine to the case of step 67 is called to have the pole assembly 9 housed. Thereafter, the flow again goes to the step 61.

After lapse of the time set at step 72, the flow goes from the step 74 to the step 75, where the pole 9 is housed.

On the other hand, at the step 76, the flag F is reset '0'. Thereafter, the flow goes to the step 75, where the pole 9 is housed.

The flag F is set '1' when the pole assembly 9 is once expanded with IG.SW. 41 turned on under the condition that the operation switch 42 is kept on, and reset '0' when IG.SW. 41 is once turned off.

The manual switch 43a of vehicle speed sensor 43 may preferably be interlocked with the operation switch 42 to give the latter 42 the role of a common switch, or the sensor 43 may be connected to the control circuit 40 through the switch 42. According to the function table of FIG. 3B and the flowchart of FIG. 3C, the pole assembly 9 remains expanded if the vehicle speed V is zero under the condition that the switches 42 and 43a are both close. In this case, the position of IG.SW. 41 is not taken into account. It may however be taken as a preferable measure to have an intervenient process executed between the steps 64 and 65, such that the pole assembly 9 can be housed in the case the condition of V=0 is extended over a predetermined period of time, 3 minutes for example. It also is possible to interpose between vehicle speed sensor 43 and control circuit 40 an integral timer consisting of a C-R circuit or the like, in place of the hysteresis setting at steps 64 and 66, to thereby permit a delayed detection signal to be input from the sensor 43 when the vehicle travels with a speed in the vicinity of predetermined value V1.

FIGS. 4A and 4B describe the constitution as well as function of a control part 100 as a first modified example of the control part 50 in the above embodiment. Like parts are designated by like reference numerals.

In the control part 100 there is employed a steering angle sensor 101 for detecting the steering angle As of an unshown steering wheel. The sensor 101 is substituted for the vehicle speed sensor 43.

As will be understood from the function table of FIG. 4B, in this modification a pole assembly 9 is housed irrespective of the operated position of a remote control operation switch 42, when the steering angle As is smaller than a predetermined value A1, i.e., generally in such cases that the vehicle travels with a relative high speed. To the contrary, the assembly 9 is housed, when the steering angle As is larger than the value A1, i.e., generally in cases the vehicle travels with a relatively low speed while turning in either direction. In the case the operation switch 42 is close, however, only an on state of an IG.SW. 41 has a priority to the steering angle As. If the IG.SW. 41 is turned on to start the vehicle, therefore, the pole assembly 9 is kept expanded for a predetermined period of time, whereas thereafter it has a controlled position depending on the magnitude of steering angle As, irrespective of the position of operation switch 42. When the steering angle As is smaller than the value A1, the detection signal is processed to be delayed. The hunting of a motor 31 is thus prevented, when the steering angle As resides in the vicinity of value A1. For example, assembly 9 is kept expanded, when the vehicle travels along a road with successive curves of which the radius of curvature is relatively large.

According to the first modified example of control part, the pole assembly 9 is permitted to be automatically expanded, when the vehicle travles along a narrow road or when it makes a sharp turn.

The control part 100 may preferably be modified by using a steering angle acceleration sensor substituted for the steering angle sensor 101, such that a pole assembly 9 is expanded when the steering angle acceleration is larger than a predetermined value. It also is possible to modify the control part 100, such that a pole assembly 9 is expanded with a signal from a sensor which detects the operation of a turning lamp control lever.

FIGS. 5A and 5B describe the constitution as well as function of a control part 200 as a second modified example of the control part 50 in the above embodiment. Like parts are designated by like reference numerals.

In the control part 200 there is employed a delay timer 201 through which a delayed signal is input from an IG.SW. 41 to a control circuit 240, in addition to a direct detection signal from the IG.SW. 41. As will be seen from the function table of FIG. 5B, in this modification a pole assembly 9 will not be let down to be housed until a predetermined period of time, two or three minutes for example, is elapsed after the IG.SW. 41 is changed to its off or ACC position under such a condition that a remote control operation switch 42 is close. In the case the assembly 9 is already housed, however, it is left housed. Ommitted part of the function table of FIG. 5B is similar to a corresponding part in the case of the control circuit 50.

According to the second modified example of control part, it is prevented for the pole assembly 9 to make a repeated expansion or contraction, even when an on-off operation of IG.SW. 41 is repeated within a relatively short interval. A corner pole device 1 is thus improved in endurability at a mobile part thereof including the pole assembly 9 and a drive mechanism 13. A software timer may preferably be substituted for the timer 201. It also is possible to employ a similar timer to the timer 201 of FIG. 5A for a modification of control part 100 shown in FIGS. 4A and 4B.

FIGS. 6A and 6B describe the constitution as well as function of a control part 300 as a third modified example of the control part 50 in the above embodiment. Like parts are designated by like reference numerals.

In the control part 300 there is additionally employed a sensor 301 for checking whether or not the key of an IG.SW. 41 is inserted in an unshown key slot. As will be seen from the function table of FIG. 6B, in this modification a pole assembly 9 is conditionally rendered "down", when the IG.SW. 41 is changed to its off o ACC position under such a condition that a remote control operation switch 42 is close. In other words, the pole assembly 9 is kept in the same position if the key of IG.SW. 41 is still left inserted, when the IG.SW. 41 is changed to the off or ACC position. Namely, the assembly 9 is left as it has been expanded or housed till then. It will be housed when the key is pulled out from the key slot under the condition that IG.SW. 41 is put in the off or ACC position. Ommitted part of the function table of FIG. 6B is similar to a corresponding part in the case of the control circuit 50.

According to the third modified example of control part, the pole assembly 9 is kept expanded or housed if the key is inserted in psoition, even when an on-off operation of IG.SW. 41 is frequently repeated within a relatively short interval. A corner pole device 1 is thus improved in endurability at a mobile part thereof including the pole assembly 9 and a drive mechanism 13. It also is possible to likewise modify control part 100 shown in FIGS. 4A and 4B.

FIGS. 7A and 7B describe the constitution as well as function of a control part 400 in a corner pole device according to a second embodiment of the present invention. Like parts are designated by like reference numerals. The corner pole device of the second embodiment is similar to that of the first embodiment with respect to the structure shown in FIGS. 1, 2A and 2B, while it is installed at a corner part of a rear bumper of an automobile.

The control part 400 comprises a control circuit 440 to which detection signals are input from an IG.SW. 41, a remote control operation switch 42, and a reverse range detector 401 for checking whether or not a speed change gear is shifted in an R (reverse) range.

The function of control part 400 is as shown in FIG. 7B.

Under such a condition that the operation switch 42 is kept off, an unshown rear pole assembly is rendered "down" irrespective of other conditions.

In the case the switch 42 is kept on, an on state of IG.SW. 41 has a priority, only when starting the vehicle. In other words, the rear pole assembly experiences an "up" phase for a predetermined period of time before it enters a "down" state, like the case of FIG. 3B, irrespective of the shift position of the speed change gear, when the IG.SW. 41 turned on from its off or ACC position.

After the execution of a sequence of processes for starting the vehicle, the rear pole assembly is expanded or contracted in accordance with the range in which the speed change gear is shifted. In the case of the R range, the rear pole assembly is rendered "up". Such a detection signal that the speed change gear is shifted to any other range than R, however, is processed to be delayed for the prevention of hunting of a motor 31 when the gear is frequently shifted to and from the R range.

According to the second embodiment, the corner pole assembly at the rear corner part of vehicle is permitted to be automatically driven into a telescopic action, when the vehicle goes back with the speed change gear in the R range. The rear corner pole assembly is automatically housed, when the R range is cancelled. The pole assembly is thus successfully driven to aptly take either of an expanded position and a housed position in dependence on the travelling condition of vehicle.

The foregoing embodiments as well as modifications thereof may preferably be executed in combination.

It will be understood from the foregoing description that according to the present invention a corner pole installed at the front or rear part of vehicle is automatically driven to aptly take either of an expanded position and a housed position in accordance with the travelling condition of vehicle.

Although there has been described what is at present considered to be the preferred embodiment of the invention, it wiil be understood that the present invention may be embodied in other specific forms without departing from the spirit or essential characteristics thereof. The present invention is therefore to be considered in all respects as illustrative but not restrictive. The scope of the invention is indicated by the appended claims rather than by the foregoing description.

What is claimed:

1. A corner pole device for vehicles including a vertically extendable and contractible pole assembly disposed at a corner part of a vehicle body, and a drive mechanism for driving said pole assembly to expand and contract between an expanded position and a housed position, wherein:

said corner pole device comprises:
- a means for detecting the travelling condition of vehicle; and
- a control means for automatically starting said drive mechanism to have said pole assembly expanded an contracted in dependence on a detection signal from said travelling condition detecting means.

2. A corner pole device for vehicles according to claim 1, wherein:

said travelling condition detecting means comprises a first detection means for detecting the operated position of an ignition switch; and said control means controls said drive mechanism in dependence on the detection signal from said first detection means so that, when said ignition switch is changed to an on position thereof, said pole assembly is first put in said expanded position for a predetermined period of time and, thereafter, in said housed position.

3. A corner pole device for vehicles according to claim 2, wherein:

said travelling condition detecting means further comprises a second detection means for detecting the vehicle speed, and a switch means for selectively connecting said second detection means to said control means;

said control means handles the detection signal from said second detection means with a priority to the detection signal from said first detection means under a condition that said second detection means is connected to said control means through said switch means; and said control means controls said drive mechanism such that said pole assembly is housed when the vehicle speed is higher than a predetermined value, and expanded when the vehicle speed is lower than said predetermined value.

4. A corner pole device for vehicles according to claim 2, wherein:

said travelling condition detecting means further comprises a third detection means for detecting the steering angle;

said control means handles the detection signal from said first detection means with a priority to the detection signal from said third detection means; and said control means controls said drive mechanism such that said pole assembly is housed when the steering angle is smaller than a predetermined value, and expanded when the steering angle is larger than said predetermined value.

5. A corner pole device for vehicles according to claim 2, wherein:

said corner pole device further comprises a delay means for having the detection signal from said first detection means delayed to be input to said control means; and said control means controls said drive mechanism in dependence on the detection signals from said first detection means and said delay means so that, when said ignition switch is changed from the on position to another position, said pole assembly is first expanded upon lapse of a predetermined period of time.

6. A corner pole device for vehicles according to claim 2, wherein:

said corner pole device further comprises a fourth detection means for detecting whether or not an ignition key is inserted in a key slot; and said control means controls said drive mechanism in dependence on the detection signals from said first detection means and said fourth detection means so that, when said ignition switch is changed from the on position to another position, said pole assembly is kept as it is in the case said ignition key is inserted in said key slot, and put in said housed position in the case said ignition key is not inserted in said key slot.

7. A corner pole device for vehicles according to claim 2, wherein:

said corner part of said vehicle body comprises a rear corner part;

said travelling condition detecting means further comprises a fifth detection means for detecting whether or not a speed change gear is shifted in a reverse range;

said control means handles the detection signal from said first detection means with a priority to the detection signal from said fifth detection means; and said control means controls said drive mechanism such that said pole assembly is expanded in the case said speed change gear is shifted in said reverse range, and housed in the case said speed change gear is set to any of other ranges than said reverse range.

8. A corner pole device for vehicles according to claim 2, further comprising:

an operation switch means for giving a command signal to said control means to compulsorily operate said drive mechanism such that said pole assembly is put in said housed position.

* * * * *